(12) United States Patent
Jechoux et al.

(10) Patent No.: US 8,467,348 B2
(45) Date of Patent: Jun. 18, 2013

(54) POWER OPTIMIZED STATION CONNECTION MANAGER IN IEEE 802.11 TYPE STATIONS

(75) Inventors: Bruno Jechoux, Biot (FR); Franck Fleter, Cagnes sur Mer (FR)

(73) Assignee: Wipro Limited, Bangalore (IN)

( * ) Notice: Subject to any disclaimer, the term of this patent is extended or adjusted under 35 U.S.C. 154(b) by 1069 days.

(21) Appl. No.: 11/774,622

(22) Filed: Jul. 9, 2007

(65) Prior Publication Data

US 2009/0016296 A1    Jan. 15, 2009

(51) Int. Cl.
*H04W 4/00*      (2009.01)
(52) U.S. Cl.
USPC ........... 370/331; 370/310; 370/328; 370/338; 455/572; 455/574
(58) Field of Classification Search
USPC .................. 370/331, 310, 328, 338; 455/572, 455/574
See application file for complete search history.

(56) References Cited

U.S. PATENT DOCUMENTS

| 7,668,128 | B1 * | 2/2010 | Benveniste | 370/311 |
| 2005/0288022 | A1 * | 12/2005 | Ryu et al. | 455/439 |
| 2006/0120355 | A1 * | 6/2006 | Zreiq et al. | 370/352 |
| 2007/0140157 | A1 * | 6/2007 | Fu et al. | 370/318 |
| 2007/0147317 | A1 * | 6/2007 | Smith et al. | 370/338 |
| 2007/0239875 | A1 * | 10/2007 | Sood et al. | 709/228 |

OTHER PUBLICATIONS

Connection Manager Application Development for Windows Mobile-based Devices, Windows Mobile Version 5.0 SDK documentation, © 2006 Microsoft Corporation. Provides an overview of the Connection manager feature and its usage scenarios.
Connection Manager Configuration, Windows Mobile Version 5.0 SDK documentation, © 2006 Microsoft Corporation. Provides information for configuring Connection manager using either XML or OMA DM-based connectivity objects.
Connection Manager Security, Windows Mobile Version 5.0 SDK documentation, © 2006 Microsoft Corporation. Contains security best practices for Connection manager.
Connection Manager Reference, Windows Mobile Version 5.0 SDK documentation, © 2006 Microsoft Corporation. Contains API reference pages for Connection manager.

\* cited by examiner

*Primary Examiner* — George Eng
*Assistant Examiner* — Jing Gao
(74) *Attorney, Agent, or Firm* — LeClairRyan

(57) ABSTRACT

A method of managing a mobile station (e.g., IEEE 802.11 station) having a serving BSS, uses a station connection manger and initially maintains a default idle stable state with minimum power to receive incoming calls. While idle, the station periodically polls and scans a detected BSS (Access Point) to detect messages using DTIM (Delivery Traffic Indication Message). A null frame sent, triggers corresponding frame transmission at an Access Point. If the null frame is acknowledged, the station switches to the active state until end of packet exchange. With no null frame acknowledged, scanning is resumed to update a BSS list prior to joining a newly found BSS via authentication and association states. When no candidate BSS is found, a time out period is used before next polling. After the last message frame is transmitted, the station resumes the default idle state. The station manager conserves battery power in the station.

20 Claims, 1 Drawing Sheet

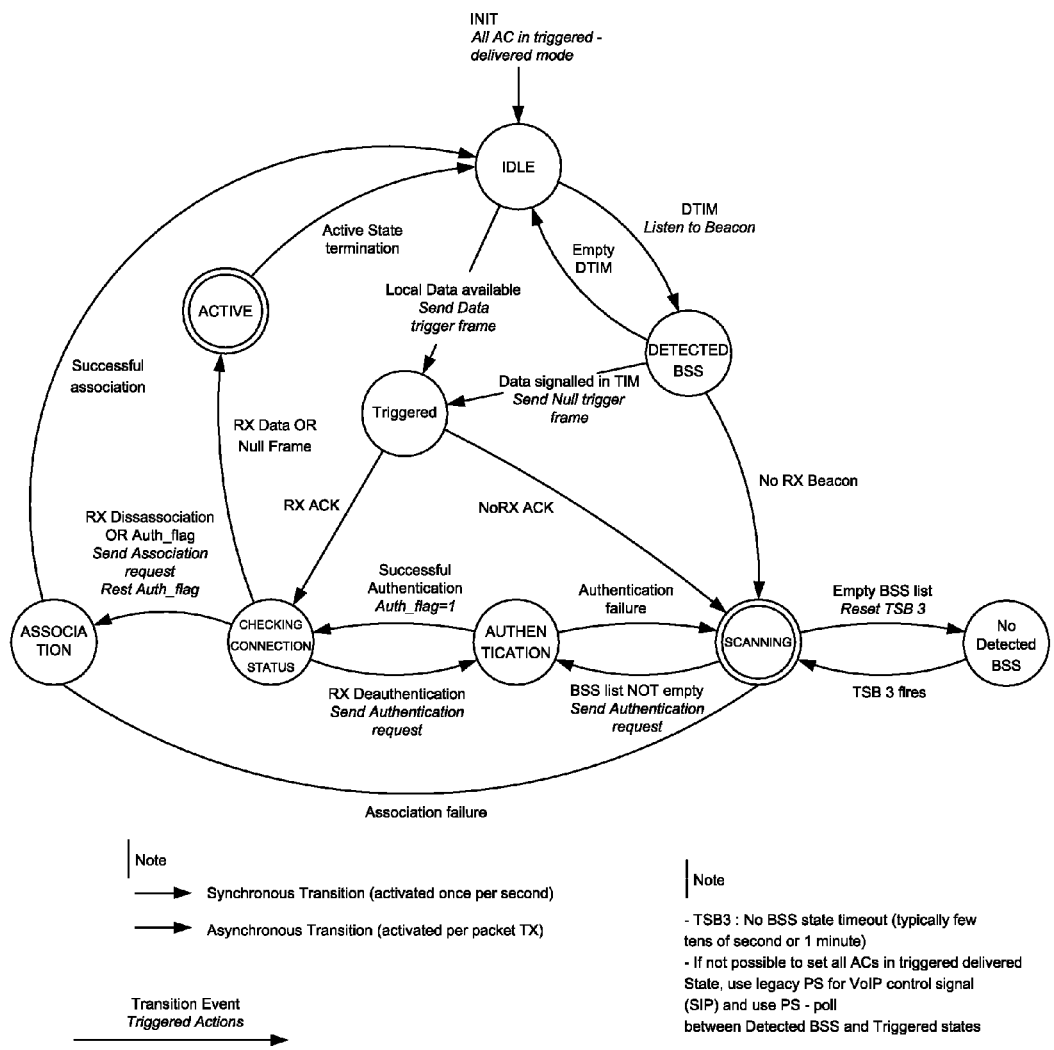

POWER OPTIMIZED STATION CONNECTION MANAGER IN IEEE 802.11 TYPE STATIONS

FIELD OF THE INVENTION

The present invention generally relates to an internal station connection manger in a mobile station, and more particularly to a power optimized station connection manager and method of mobile station management selectively using an algorithm for managing VoIP and PUSH capabilities.

BACKGROUND OF THE INVENTION

In the deployment of wireless mobile stations, e.g., of the IEEE 802.11 type, seamless mobility depends on solving a host of wireless access issues for the end user. Equipment and devices must be configured to negotiate many different frequencies, protocols, technologies, network types, regulatory environments and more, simultaneously not making the underlying complexity transparent to the end user, so as to ensure a truly seamless experience for the user.

A description of the manner in which connection managers have been used in prior art is believed to be conducive to an understanding of how the present invention differs. A connection manager in known art simplifies connectivity by abstracting all of the connection information from applications. The primary purpose of the connection manager in prior art is to centralize and automate the establishment and management of various kinds of network connections. Thus, an application only requires information about which network to access rather than all of the connection settings. With connection managers as known earlier, an application is configured to specify a connection name and network name, and the connection manager performs all of the tasks associated with establishing the connection.

As known, it is possible to configure connection manager for a Windows Mobile-based device using XML. It is also possible to configure connection manager using OMA DM-based connectivity objects.

Another connection manager of a known form manages network connections for CellCore-enabled devices, regardless of the service provider used for establishing the connection. Such connection manager provides a fast and transparent way of making connection choices for an application. Users do not have to know which connection path is chosen, yet they can be assured that the most optimal path is used all the time.

Other known forms of connection managers handle many different types of connections, including connections using Point-to-Point Protocol (PPP), Remote Access Service (RAS), and Point-to-Point Tunneling Protocol (PPTP). The manager can also configure proxy server settings to allow network resources through a firewall or Wireless Application Protocol (WAP) gateway. As known, some dual-mode cellular phones will support seamless from WiFi to cellular networks when WiFi is unavailable to a caller. That is one of the biggest challenges facing VoWiFi-roaming access. A WiFi access point offers a communication range of up to 90 meters (commonly called a hotspot), and continuous conversations would mean that the caller must stay within an area of overlapping hotspots, or as already suggested, have a VoWiFi dual-mode phone that would switch to a regular cellular phone transmission when the caller moves out of a hot spot range.

In existing 802.11 STA implementations, functions performed by known types of connection manager, which comprise part of lower management layers but beyond the 802.11 standard-scope, are very limited because the wireless functionality can be handled as a slave by higher layers (e.g. application layer) and hence triggered by higher layers when needed, to be dormant or idle otherwise.

With new kind of applications coming over WLAN, such as VoIP or PUSH services, a modified type of autonomic station connection manager is required.

SUMMARY OF THE INVENTION

The present invention in a preferred form offers a method of managing a mobile station enabling seamless handoff, and provides a power optimized station connection manager with VoIP and 'push' capabilities, which is able to continuously maintain and monitor authentication and association which are required in order to be able to receive incoming calls (e.g. from a SIP proxy) or to support 'push' services (chat session, SMS, MMS).

In one form, the present station connection manager provides selective power optimization, including incoming call support and adaptive association/authentication keep alive capabilities. As described hereinafter, one form of the present station connection manager is configured to be highly power-consumption-aware to fulfill desirable requirements of battery powered devices.

The invention in a broad form resides in a method of managing a mobile station which is associated with a serving BSS, comprising the steps of: using an autonomous station connection manger and initially maintaining a default idle stable state at a minimum level of activity and low power consumption sufficient to receive an incoming call; while in the idle stable state, periodically polling and scanning a detected BSS (Access Point) to detect relevant messages using DTIM (Delivery Traffic Indication Message); sending a null frame to trigger corresponding frame transmission at an Access Point; using the trigger to verify if the null frame is acknowledged, and then switching the mobile station to an active state until end of packet exchange as managed internally by the station connection manager; and, if the null frame is not acknowledged, resuming scanning to update a BSS list prior to joining a newly found BSS via authentication and association states.

BRIEF DESCRIPTION OF THE DRAWING

FIG. 1 shows a flow chart illustrating how the present station connection manager causes and controls the flow of different stages in the handling of incoming messages and assists in handoff.

DETAILED DESCRIPTION OF EMBODIMENTS

A detailed description of one or more embodiments of the invention is provided below along with an accompanying FIGURE that illustrates by way of example the principles of certain embodiments of the invention. While the invention is described in connection with such embodiments, it should be understood that the invention is not limited to any embodiment. On the contrary, the scope of the invention is limited only by the appended claims and equivalents, and the invention encompasses numerous alternatives and modifications. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

In one preferred form, the present station connection manager as described herein is configured for actively probing the BSS to monitor and maintain the connection status through null-frame or data-frame transmission and trigger re-authentication, re-association when needed.

An exemplary proposed station connection manager performs the following functions:
- periodic polling of incoming calls or push messages (via DTIM reading),
- control of scanning,
- authentication keep alive,
- association keep alive, and
- control of STA power modes (idle or active).

In addition, in order to minimize the power consumption, which is a key parameter for typical battery powered stations, an adaptive association/authentication keep-alive algorithm is deployed (in an embodiment of the invention). The algorithm is geared to adapt the following keep-alive-functions to each specific serving AP (adaptation to AP implantation dependent inactivity timeout):
a. it estimates the inactivity time out parameter of the serving AP (implementation dependent) via a timer ramp up procedure;
b. it uses the estimated time out to set-up its polling period optimally.

Certain exemplary time out and timing considerations used in the implementation of the present invention are shown in the table below and described in greater detail in the context of the flow chart of FIG. 1:

| | |
|---|---|
| TSB3 | Time out before performing next scanning when no BSS was found (typically few tens of second or 1 minute) |
| TSB1max | TSB1 timer value |
| TRU_initial | Initial value for the timer ramp up algorithm (typically 10 or 15 s). |
| TRU_ON | Timer Ramp Up function switch |

Advantageously, the mobile station with the use of the present connection manager can maintain its association autonomously with a serving AP which is necessary to allow detection of VoIP incoming calls or PUSH messages. The present connection manager is also configured to minimize the impact of power consumption because of the smart adaptive periodic polling.

An example of how the mobile station is managed using the present inventive station connection manager is illustrated in the flow chart of FIG. 1. The following description has to be understood in the context of the flow chart depicted in FIG. 1.

The station connection manager maintains the minimum level of activity and energy consumption necessary to be able to receive an incoming VoIP call or a PUSH message. If this occurs the device switches from IDLE to Active state until the end of call or packet exchange (managed internally by the active mode state machine, for example by scanning).

IDLE and Active are stable states, all the other states are transient. Active state is a macro state embedded in a station connection manager used when the device is active.

By default, the connection manager device is in the IDLE state and it periodically invokes Detected BS to detect relevant messages in the DTIM (signaling included in beacon and aiming to inform the stations in power save mode that some data is available for them at AP side). In this case a null frame is sent to trigger corresponding frame transmission at the AP {c.f. U-APSD (Unscheduled Automatic Power Save Delivery) specification} and the Triggered state is invoked to check if the trigger frame is acknowledged by the AP. From this point, the follow up might be as follows:
- If the trigger frame is acknowledged: The device goes to Checking connection status and waits for the triggered data frame or Null frame from the AP. Once it is received, the device switches to an active state.
- If there is no acknowledgement (after due retransmissions) for the trigger frame: the Scanning state is called to update the BSS list prior to joining the newly found BSS via Authentication and Association states. The device then comes back to the idle stable state.

If the scanning fails, the device switches to NO detected BSS and waits for TSB3 timeout before retrying the scanning. As long as the scanning fails, the device oscillates between Scanning and NO Detected BSS.

Once the active state is completed, the device and the mobile station come back to the stable idle state.

The description above is valid for a device supporting U-APSD power save mode with all access classes in the triggered delivered state (c.f. 802.11e specification). If that is not the case, legacy PS (Power Save) (as specified in 802.11-1999 specifications) may be used for VoIP control signal, and the station (STA) would send a PS-Poll frame to the AP instead of data or null trigger frames.

The present invention includes a computer readable medium encoded with software data/instruction which when executed by a computing platform would result in execution of a method as described and claimed herein. Different embodiments of the present subject matter can be implemented in software which can be used in any suitable computing environment. The embodiments of the present subject matter are also operable in a number of general-purpose or special-purpose computing environments, or processors or processing units. Some computing environments include personal computers, general-purpose computers, server computers, hand-held devices {including, but not limited to, telephones and personal digital assistants (PDAs) of all types}, laptop devices, multi-processors, microprocessors, set-top boxes, programmable consumer electronics, network computers, minicomputers, mainframe computers, distributed computing environments and the like to execute code stored on a computer-readable medium or computer memory elements. The embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as referred to hereinabove, includes any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

In the foregoing detailed description of embodiments of the invention, various features are grouped together in a single exemplary embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should therefore be determined with reference to the appended claims, along with the full scope of equivalents to which such claims are entitled. In the appended claims, the terms "including" and "in which" if used are the plain-English equivalents of the respective terms "comprising" and "wherein," respectively. Moreover, the terms "first," "second," and "third," etc., if used are merely as labels, and are not intended to impose numerical requirements on their objects.

The invention claimed is:

1. A method of managing a mobile station which is associated with a serving Access Point and interacting with a candidate Access Point for handoff while roaming, comprising:

initially maintaining the mobile station in a default idle stable state at a minimum level of activity and power consumption sufficient to receive an incoming call using an autonomous station connection manager, wherein the autonomous station connection manager maintains an association of the mobile station with the serving Access Point;

while in said default idle stable state, periodically polling according to a polling period and scanning calls coming into the mobile station using DTIM (Delivery Traffic Indication Message) to detect the candidate Access Point, wherein the polling period is determined by:

estimating an implementation dependent inactivity time out of each serving Access Point using a timer ramp up procedure; and using the estimated time out to optimally set up the polling period;

sending a null frame to trigger corresponding frame transmission at the detected candidate Access Point;

verifying if the null frame is acknowledged by the detected candidate Access Point, and if the null frame is acknowledged, then configuring the autonomous station connection manager for:

checking connection status between the mobile station and the detected candidate Access Point, initiating re-authentication and re-association of the mobile station with the detected candidate Access Point for handoff as needed using an authentication and association keep alive algorithm; and switching the mobile station to an active state until end of packet exchange as managed internally; and if the null frame is not acknowledged, resuming scanning to update an Access Point list prior to joining a newly found candidate Access Point via authentication and association states.

2. The method as in claim 1 further comprising continually but selectively maintaining and monitoring authentication and association, and hence receiving incoming calls including SIP (Session Initiation Protocol) proxy, and for supporting push services.

3. The method as in claim 2 wherein said push services selectively include chat session, SMS (Short Message Service) and MMS (Multimedia Messaging Service).

4. The method as in claim 1 wherein the initiating handoff and re-association is performed as needed.

5. The method as in claim 1, further comprising selectively performing by the autonomous station connection manager periodic polling of incoming calls and push messages.

6. The method as in claim 5 further comprising using a time out period when no candidate Access Point is found for hand off.

7. The method as in claim 1 further comprising controlling by the autonomous station connection manager station power modes between said default idle stable state and said active state.

8. The method as in claim 7, wherein said mobile station is battery powered, and further comprising using the association and authentication keep alive algorithm which adapts to the serving Access Points implementation dependent inactivity time out.

9. A method of managing an IEEE 802.11 type mobile station which is associated with a serving Access Point, said mobile station having a stable default idle state and a stable active state, said method comprising:

initially maintaining the mobile station in the stable default idle state at a minimum level of activity and power consumption sufficient to receive an incoming call using an autonomous station connection manager;

while in said stable default idle state, periodically polling according to a polling period and scanning calls coming into the mobile station using DTIM (Delivery Traffic Indication Message) to detect a candidate Access Point, wherein the polling period is determined by:

estimating an implementation dependent inactivity time out of each serving Access Point using a timer ramp up procedure; and using the estimated time out to optimally set up the polling period;

sending a null frame to trigger corresponding frame transmission at the detected candidate Access Point;

verifying if the null frame is acknowledged by the detected candidate Access Point, and if the null frame is acknowledged, then configuring the autonomous station connection manager for:

checking connection status between the mobile station and the detected candidate Access Point;

initiating re-authentication and re-association of the mobile station with the detected candidate Access Point for handoff as needed using an authentication and association keep alive algorithm; and switching the mobile station to the stable active state until end of packet exchange as managed internally; and if the null frame is not acknowledged, resuming scanning to update an Access Point list prior to joining a newly found candidate Access Point via authentication and association states.

10. The method as in claim 9 including the step of continually but selectively maintaining and monitoring authentication and association, and hence receiving incoming calls including SIP (Session Initiation Protocol) proxy, and for supporting push services.

11. The method as in claim 10 wherein said push services selectively include chat session, SMS (Short Message Service) and MMS (Multimedia Messaging Service).

12. The method as in claim 9 wherein the initiating handoff and re-association is performed as needed.

13. The method as in claim 9, further comprising selectively performing by the autonomous station connection manager periodic polling of incoming calls and push messages.

14. The method as in claim 13 further comprising using a time out period when no candidate Access Point is found for hand off.

15. The method as in claim 9, further comprising controlling by the autonomous station connection manager station power modes between said stable default idle state and said stable active state.

16. The method as in claim 15, wherein said mobile station is battery powered, and further comprising using the association and authentication keep alive algorithm which adapts to the serving Access Points implementation dependent inactivity time out.

17. A method of managing a mobile station which is associated with a serving Access Point from a plurality of Access Points, wherein said mobile station is battery powered, comprising:
  initially maintaining the mobile station in a default idle stable state at a minimum level of activity and power consumption sufficient to receive incoming calls and push messages using an autonomous station connection manager, wherein the autonomous station connection manager maintains an association of the mobile station with the serving Access Point;
  while in said default idle stable state, using an autonomous station connection manager for selectively doing periodic polling according to a polling period and scanning of incoming calls and push messages using DTIM (Delivery Traffic Indication Message) to detect a candidate Access Point, wherein the polling period is determined by:
    estimating an implementation dependent inactivity time out of each serving Access Point using a timer ramp up procedure; and
    using the estimated time out to optimally set up the polling period;
  to perform said scanning, selectively probing said serving Access Point for monitoring and maintaining connection status through null-frame transmission and trigger re-authorization, comprising the steps of:
    sending a null frame to trigger corresponding frame transmission at the detected candidate Access Point;
    verifying if the null frame is acknowledged by the detected candidate Access Point, and if the null frame is acknowledged then configuring the autonomous station connection manager for:
      checking connection status between the mobile station and the detected candidate Access Point;
      initiating re-authentication and re-association of the mobile station with the detected candidate Access Point for handoff as needed using authentication and association keep alive algorithms; and
      switching the mobile station to a stable active mode until end of packet exchange as managed internally; and,
    if the null frame is not acknowledged, resuming scanning to update an Access Point list prior to joining a newly found candidate Access Point via authentication and association states.

18. A method of managing a mobile station which is associated with a serving Access Point, comprising:
  using an autonomous station connection manager to maintain association of the mobile station with the serving Access Point, and initially maintaining a default idle stable state at a minimum level of activity and power consumption sufficient to receive an incoming call;
  while in said default idle stable state, maintaining adaptive polling of calls coming into the mobile station using DTIM (Delivery Traffic Indication Message) according to a polling period to detect a candidate access point, wherein the polling period is determined by:
    estimating an implementation dependent inactivity time out of each serving Access Point using a timer ramp up procedure; and
    using the estimated time out to optimally set up the polling period;
  sending a null frame to trigger corresponding frame transmission at the detected candidate Access Point;
  verifying if the null frame is acknowledged by the detected candidate Access Point, and if the null frame is acknowledged, then configuring the autonomous station connection manager for:
    checking connection status between the mobile station and the detected candidate Access Point;
    initiating re-authentication and re-association of the mobile station with the detected candidate Access Point for handoff as needed using authentication and association keep alive algorithms; and
    switching from said default idle stable state to a stable active state until end of packet exchange in the incoming call as managed internally;
  if the null frame is not acknowledged, resuming scanning to update an Access Point list prior to joining a newly found candidate Access Point via authentication and association states; and
  minimizing power consumption by controlling said polling, re-association and switching.

19. A non-transitory computer readable medium encoded with data/instruction which when executed by a computing platform results in execution of a method of managing a mobile station which is associated with a serving Access Point and interacting with a candidate Access Point for handoff while roaming, comprising:
  initially maintaining the mobile station in a default idle stable state at a minimum level of activity and power consumption sufficient to receive an incoming call using an autonomous station connection manager, wherein the autonomous station connection manager maintains an association of the mobile station with the serving Access Point;
  while in said default idle stable state, periodically polling according to a polling period and scanning calls coming into the mobile station using DTIM (Delivery Traffic Indication Message) to detect the candidate Access Point, wherein the polling period is determined by:

estimating an implementation dependent inactivity time out of each serving Access Point using, a timer ramp up procedure; and
using the estimated time out to optimally set up the polling period;
sending a null frame to trigger corresponding frame transmission at the detected candidate Access Point;
verifying if the null frame is acknowledged by the detected candidate Access Point, and if the null frame is acknowledged, then configuring the station connection manager for:
checking connection status between the mobile station and the detected candidate Access Point;
initiating re-authentication and re-association of the mobile station with the detected candidate Access Point for handoff as needed using authentication and association keep alive algorithms; and
switching the mobile station to an active state until end of packet exchange as managed internally; and
if the null frame is not acknowledged, resuming scanning to update an Access Point list prior to joining a newly found candidate Access Point via authentication and association states.

20. A non-transitory computer readable medium encoded with data/instruction which when executed by a computing platform results in execution of a method of managing an IEEE 802.11 type mobile station which is associated with a serving Access Point, said station having a stable default idle state and a stable active state, said method comprising:
initially maintaining the mobile station in the stable default idle state at a minimum level of activity and power consumption sufficient to receive an incoming call using an autonomous station connection manager, wherein the autonomous station connection manager maintains an association of the mobile station with the serving Access Point;
while in said stable default idle state, periodically polling according to a polling period and scanning calls coming into the mobile station using DTIM (Delivery Traffic Indication Message) to detect a candidate Access Point, wherein the polling period is determined by:
estimating an implementation dependent inactivity time out of each serving Access Point using a timer ramp up procedure; and
using the estimated time out to optimally set up the polling period;
sending a null frame to trigger corresponding frame transmission at the detected candidate Access Point;
verifying if the null frame is acknowledged by the detected candidate Access Point, and if the null frame is acknowledged, then configuring the autonomous station connection manager for:
checking connection status between the mobile station and the detected candidate Access Point;
initiating re-authentication and re-association of the mobile station with the detected candidate Access Point for handoff as needed using authentication and association keep alive algorithms; and
switching the mobile station to the stable active state until end of packet exchange as managed internally; and
if the null frame is not acknowledged, resuming scanning to update an Access Point list prior to joining a newly found candidate Access Point via authentication and association states.

* * * * *